US012711660B2

(12) United States Patent
Urfalioglu

(10) Patent No.: US 12,711,660 B2
(45) Date of Patent: Aug. 18, 2026

(54) METHOD AND IMAGE PROCESSING ARRANGEMENT FOR ESTIMATING A LIKELY POSE IN RESPECT OF A SPATIAL REGION

(71) Applicant: Yinwang Intelligent Technologies Co., Ltd., Shenzhen (CN)

(72) Inventor: Onay Urfalioglu, Munich (DE)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 355 days.

(21) Appl. No.: 18/452,401

(22) Filed: Aug. 18, 2023

(65) Prior Publication Data

US 2023/0401742 A1 Dec. 14, 2023

Related U.S. Application Data

(63) Continuation of application No. PCT/EP2021/054089, filed on Feb. 19, 2021.

(51) Int. Cl.
*G06T 7/73* (2017.01)

(52) U.S. Cl.
CPC ...... *G06T 7/74* (2017.01); *G06T 2207/30244* (2013.01)

(58) Field of Classification Search
CPC ............. G06T 7/74; G06T 2207/30244; G06T 2207/10024; G06T 2207/20076
See application file for complete search history.

(56) References Cited

U.S. PATENT DOCUMENTS

2010/0331855 A1* 12/2010 Zhao ...................... A61B 34/30 606/130
2013/0182947 A1* 7/2013 Wang ...................... G06T 7/251 382/159
2018/0315221 A1* 11/2018 Jones ...................... G06F 18/22
2018/0365853 A1* 12/2018 Yang ......................... G06T 7/75
(Continued)

OTHER PUBLICATIONS

David et al., "SoftPOSIT: Simultaneous Pose and Correspondence Determination," Springer Link, pp. 698-714 (Sep. 2004).
(Continued)

*Primary Examiner* — Jennifer Mehmood
*Assistant Examiner* — Vaisali Rao Koppolu
(74) *Attorney, Agent, or Firm* — Leydig, Voit & Mayer, Ltd.

(57) ABSTRACT

There is provided a method for estimating a pose of an image in a spatial region and an image processing arrangement. The image processing arrangement is coupled to an imaging capturing arrangement configured to capture one or more 2-D images of a scene within the spatial region. The image processing arrangement is provided with spatial coordinates of a plurality of 3-D point locations within the spatial region. The method includes identifying key features present in 2-D images; identifying a correspondence of clusters of the plurality of 3-D point locations to key feature points present in the 2-D images; and from the identified correspondence, estimating the likely pose of the image processing arrangement relative to the spatial region by using a multi-match likelihood function that finds for each 3-D point location a closest 2-D feature point among k possible 2-D key feature points, where k is an integer greater than one.

16 Claims, 4 Drawing Sheets

(56) References Cited

U.S. PATENT DOCUMENTS

2020/0184727 A1* 6/2020 Ha .......................... G06T 15/10
2021/0118160 A1* 4/2021 Farås ........................ G06T 7/73
2021/0314551 A1* 10/2021 Tang .................... G06V 10/764

OTHER PUBLICATIONS

Mur-Artal et al., "ORB-SLAM: A Versatile and Accurate Monocular SLAM System," IEEE Transactions on Robotics, vol. 31, No. 5, pp. 1147-1163, Institute of Electrical and Electronics Engineers, New York, New York (Oct. 2015).

Feng et al., "2D3D-Matchnet: Learning To Match Keypoints Across 2D Image And 3D Point Cloud," 2019 International Conference on Robotics and Automation (ICRA), Palais des congres de Montreal, Montreal, Canada, pp. 4790-4796, Institute of Electrical and Electronics Engineers, New York, New York (May 20-24, 2019).

* cited by examiner

Figure 4:
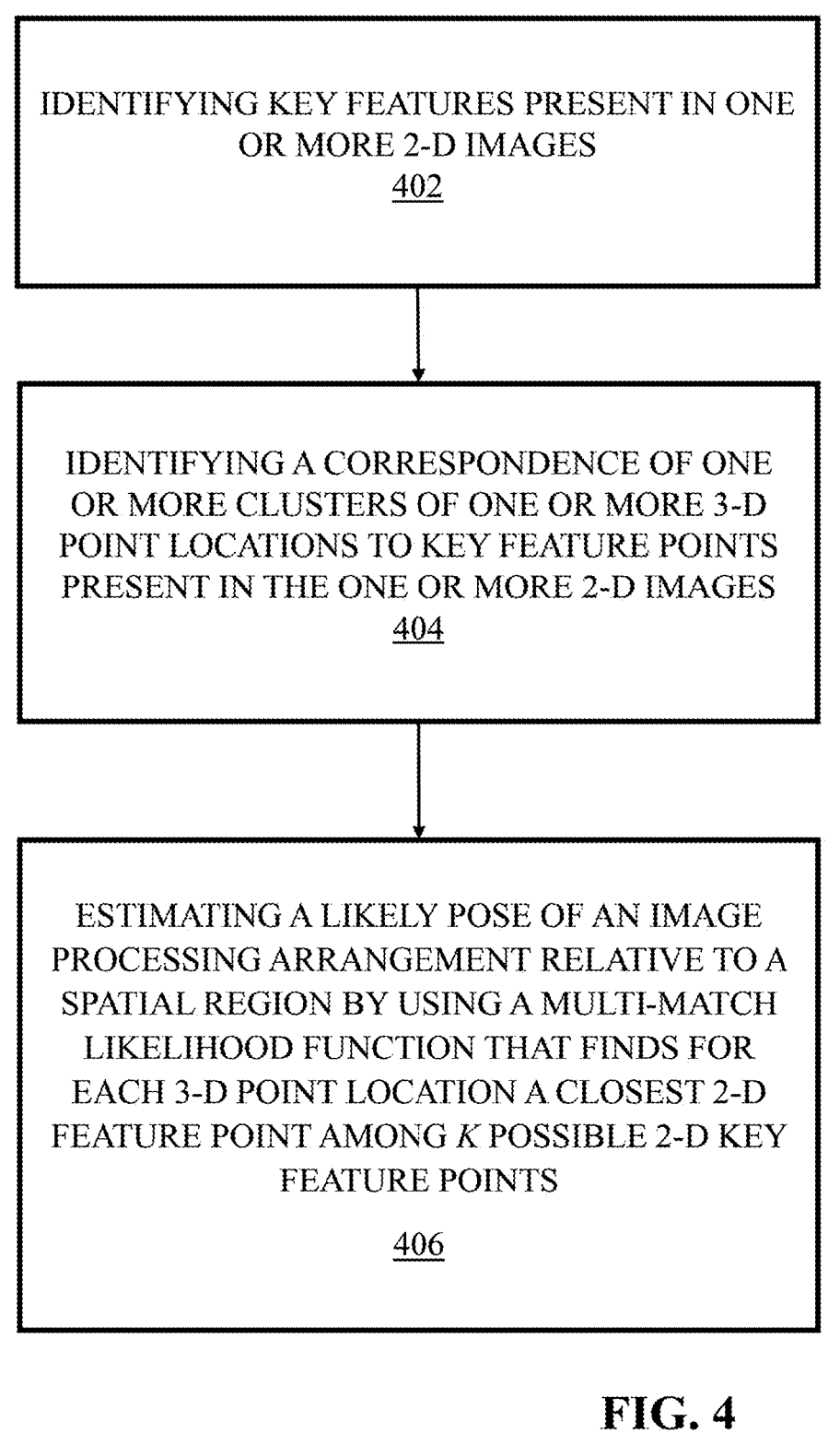

IDENTIFYING KEY FEATURES PRESENT IN ONE OR MORE 2-D IMAGES
402

IDENTIFYING A CORRESPONDENCE OF ONE OR MORE CLUSTERS OF ONE OR MORE 3-D POINT LOCATIONS TO KEY FEATURE POINTS PRESENT IN THE ONE OR MORE 2-D IMAGES
404

ESTIMATING A LIKELY POSE OF AN IMAGE PROCESSING ARRANGEMENT RELATIVE TO A SPATIAL REGION BY USING A MULTI-MATCH LIKELIHOOD FUNCTION THAT FINDS FOR EACH 3-D POINT LOCATION A CLOSEST 2-D FEATURE POINT AMONG *K* POSSIBLE 2-D KEY FEATURE POINTS

METHOD AND IMAGE PROCESSING ARRANGEMENT FOR ESTIMATING A LIKELY POSE IN RESPECT OF A SPATIAL REGION

CROSS-REFERENCE TO RELATED APPLICATIONS

This application is a continuation of International Application No. PCT/EP2021/054089, filed on Feb. 19, 2021, the disclosure of which is hereby incorporated by reference in its entirety.

TECHNICAL FIELD

Embodiments of the disclosure generally relate to image processing, and particularly relate to a method and an image processing arrangement for estimating a likely pose in respect of a spatial region.

BACKGROUND

Building a map, localizing within the map, and planning using the map is an important task for autonomous systems such as robotics, ADAS, and self-driving systems. While the interdependency between mapping and localization is well known as the Simultaneous Localization and Mapping, SLAM, problem, there is a growing understanding in contemporary research communities that planning how the autonomous systems go about mapping and exploring an unknown environment (and operating in the environment thereafter) can avoid degenerate conditions and significantly reduce complexity of the SLAM. Thus, the task of exploring a new environment combines all three problems of building the map, localizing within the map, and planning using the map since the autonomous systems must be able to find actions that reduce uncertainty in both mapping and localization.

In location-based mapping, one of the most important sensor inputs comes from visual sensors, such as digital cameras. Furthermore, 3D feature points can be determined by detecting and matching 2D feature points in image data captured using a stereo camera or from cameras with known pose with respect to each other. The most successful relative Pose Estimation methods of a camera, relative to a set of the 3D feature points, rely on detecting 2D feature points in the image captured by the camera and matching those 2D feature points and the 3D feature points to find the feature correspondences.

The matching is typically done based on feature descriptor similarity. A feature descriptor is typically a vector of values describing the local environment of the feature point in the image. Using those matches, the relative pose of the camera may be estimated by the Perspective-n-Point (PnP) method. Moreover, it is crucial to find enough correct correspondences (called inliers) in different regions of the image to be able to accurately estimate pose. In cases, where the involved images are similar in perspective (e.g., captured from cameras looking in the same direction and being close in space) of content and lighting conditions (no occlusions, etc.), matching feature points in other images can give enough inliers.

The conventional pose estimation generally follows two approaches. In a first pose estimation approach, the feature points of both reference image and target image captured are detected. A feature point matching is then performed to determine correspondences between feature points in both images and then compute the image pose. Generally, during image capture in real-time, the resultant image may have many occlusions, lighting differences, motion blur, etc. This makes the matching of features to feature points very challenging. Consequently, there can be multiple mismatches, which in turn makes the pose estimation difficult. For example, if any important feature point is missed due to wrong matches, the pose cannot be estimated correctly.

In another pose estimation approach, once the feature points are detected for both reference and target images, matching between the features and feature points is performed simultaneously to determine the correspondences and then perform the pose computation. Though simultaneous matching of feature points and estimating pose is very desirable to achieve, it is very difficult to perform such an execution due to a large number of possible matches and the multi-modality of the pose parameter space, which in turn requires too much computational resource.

Though simultaneous matching of feature points and estimating pose is very desirable to achieve, it is very difficult to perform such an execution due to a large number of possible matches and the multi-modality of the pose parameter space, which in turn requires too much computational resource.

Therefore, there arises a need to address the aforementioned technical drawbacks in capturing inliers as compared to the existing methods in an efficient way.

SUMMARY

It is an object of the disclosure to provide an improved method and an improved image processing arrangement for estimating a likely pose relative to a spatial region while avoiding one or more disadvantages of prior art approaches.

This object is achieved by the features of the independent claims. Further implementation forms are apparent from the dependent claims, the description, and the figures.

The disclosure provides an improved method and an image processing arrangement for estimating a likely pose of in respect of a spatial region.

According to a first aspect, there is provided a method for estimating a likely pose of an image processing arrangement in respect of a spatial region. The image processing arrangement is coupled to an imaging capturing arrangement that is configured to capture one or more 2-D images of a scene within the spatial region and the image processing arrangement is provided with spatial coordinates of a plurality of 3-D point locations within the spatial region. The method includes identifying key features present in the one or more 2-D images. The method includes identifying a correspondence of one or more clusters of the plurality of 3-D point locations to key feature points present in the one or more 2-D images. The method includes, from the identified correspondence, estimating the likely pose of the image processing arrangement relative to the spatial region by using a multi-match likelihood function that finds for each 3-D point location a closest 2-D feature point among k possible 2-D key feature points, where k is an integer greater than one.

According to the method herein, instead of determining one single match for a reference 3D feature point, a plurality of best 2D feature point matches are determined for a reference feature point. This in turn creates a collection of multi-matches. Thus, the use of multi-matching and identification of a best match from a plurality of possible matches, thereby providing the flexibility of capturing a larger set of inliers in different regions of the image to be able to accurately estimate a likely pose.

Optionally, the method includes determining the spatial coordinates of a plurality of 3-D point locations within the spatial region from a plurality of images captured from mutually different angular perspectives.

Optionally, the method includes implementing the multi-match likelihood function as a sampling-based framework to search for a best pose for the likely pose by computing a maximum value for the multi-match likelihood function. The sampling-based framework avoids finding local minima for a cost function and finds a best overall minimum for the cost function.

Optionally, the method includes using an optimization process that is used to adaptively select a closest 2-D key feature point among k best matches, to capture an increased number of inliers within the 2-D image.

Optionally, the method includes implementing the multi-match likelihood function as follows:

$$L(\Theta) = \sum_i^N \log\left(\exp\left(\frac{|P(\Theta)Q_i - m_i|^2}{2\sigma^2}\right) + \varepsilon\right)$$

where $Q_i$ is an i-th 3D feature point, $P(\Phi)$: is an inverse camera pose parameterized by $\Phi$; $P(\Phi)$ $Q_i$: is point coordinates of the 3-D feature point projected $Q_i$ into a target image, $m_i$: is an i-th 2-D feature point in the target image potentially corresponding to the 3-D feature point $Q_i$; and $\varepsilon$: =a constant of uniform outlier distance distribution. The pose parameters $\Phi$ are chosen such that a multi-match likelihood $L(\Phi)$ is maximized to determine the likely pose.

The multi-match likelihood function may be implemented as a single-match robust likelihood function as follows:

$$L(\Theta) = \sum_i^N \log\left(\exp\left(\min_{j=1}^{k} \frac{|P(\Theta)Q_i - m_{ij}|^2}{2\sigma^2}\right) + \varepsilon\right)$$

where an index k is typically a small number, optionally in a range of 0 to 10; $Q_i$ is an i-th 3D feature point; $P(\Phi)$ is an inverse camera pose parameterized by $\Phi$, $P(\Phi)$ $Q_i$: is point coordinates of the 3D feature point $Q_i$ projected into a target image, $m_{ij}$: is the ij-th 2D feature points in the target image potentially corresponding to 3D feature point $Q_i$; and E: is a constant of uniform outlier distance distribution. For each given pose parameter $P(\Phi)$, the method includes firstly finding a spatially closest point $m_{ij}$ among k $m_{ij}$, j=1, . . . ,k, and then computing a multi-match likelihood $L(\Phi)$ based on the closest point $m_{ij}$. Here, N can be in the order of thousands.

The multi-match likelihood function may be implemented as a multi-match robust likelihood function as follows:

$$\text{for all } i: m_i = \min_{j=1}^{k} f(\Theta, Q_i, m_{ij}, D_q, D_{m_{ij}})$$

$$L(\Theta) = \sum_i^N \log\left(\exp\left(\frac{|P(\Theta)Q_i - m_i|^2}{2\sigma^2}\right) + \varepsilon\right)$$

where $Q_i$: is an i-th 3D feature point; $P(\Phi)$: is an inverse camera pose parameterized by $\Phi$, is $P(\Phi)$ $Q_i$: point coordinates of the 3D feature point $Q_i$ projected into target image to obtain $q_i$, $m_{ij}$ is ij-th 2D feature points in a target image potentially corresponding to a 3D feature point $Q_i$, $\varepsilon$: is a constant of uniform outlier distance distribution; $D_q$, $D_m$ is descriptor vectors of q and m, respectively; $f(\Phi, Q_i, m_{ij}, D_q, D_{m_{ij}})$ is a function to determine a distance depending on both the descriptor similarity as well as spatial distance between the projection q of the 3D point Q into the image and its potential correspondence m. For each given pose parameter $P(\Phi)$, the method includes firstly finding a closest point $m_{ij}$ among k $m_{ij}$, j=1, . . . ,k, w.r.t. f( ), and then computing a multi-match likelihood $L(\Phi)$ based on the closest point $m_{ij}$. k is generally a small number, for example in a range of 0 to 10.

The multi-match likelihood function may be implemented as a multi-match robust likelihood function as follows:

$$\text{For all } i: m_i = \min_{j=1}^{k} f(\Theta, Q_i, m_{ij}, D_q, D_{m_{ij}})$$

$$L(\Theta) = \sum_i^N \log\left(\exp\left(\frac{|P(\Theta)Q_i - m_i|^2}{2\sigma^2}\right) + \varepsilon\right)$$

where a function f( ) is defined by $$f(\Theta, Q_i, m_{ij}, D_q, D_{m_{ij}}) = |P(\Theta)Q_i - m_{ij}|^2 + \lambda * |D_q - D_{m_{ij}}|^2 \text{ or } f(\Theta, Q_i, m_{ij}, D_q, D_{m_{ij}}) = |P(\Theta)Q_i - m_{ij}|^2 + \lambda * \left(1 - \frac{D_q m_{ij}}{|D_q||D_{m_{ij}}|}\right);$$

where a position of q in a given image depends both on camera pose parameters $\Phi$ and their 3D position $Q$, $q_i = P(\Phi)$ $Q_i$; wherein, for a given feature point q, there are k potential correspondences, and $m_{ij}$: =i, j-th 2D feature points in a target image potentially corresponding to a 3D feature point $Q_i$, $\varepsilon$: =a constant of uniform outlier distance distribution and $D_q$, $D_m$: =descriptor vectors of q and m, respectively.

According to a second aspect, there is provided an image processing arrangement for estimating a likely pose of in respect of a spatial region. The image processing arrangement is coupled to an imaging capturing arrangement that is configured to capture one or more 2-D images of a scene within the spatial region. The image processing arrangement is provided with spatial coordinates of a plurality of 3-D point locations within the spatial region. The image processing arrangement is configured to identify key features present in the one or more 2-D images. The image processing arrangement is configured to identify a correspondence of one or more clusters of the plurality of 3-D point locations to key feature points present in the one or more 2-D images. The image processing arrangement is configured to, from the identified correspondence, estimate the likely pose of the image processing arrangement relative to the spatial region by using a multi-match likelihood function that finds for each 3-D point location a closest 2-D feature point among k possible 2-D key feature points. Here k is an integer greater than one.

The image processing arrangement herein is configured to simultaneously determine multiple matches of features of 3D feature points to 2D feature points in images and identify for each 3D feature point. This approach does not necessitate deciding on a fixed set of correspondences before conducting any optimization process. Furthermore, the closest 2D feature point can be adaptively selected among the plurality of best matches during the optimization process. Due to the use of the plurality of matches of the feature points, a much larger set of correspondences may be compared to traditional approaches efficiently.

Optionally, the image processing arrangement is configured to determine the spatial coordinates of a plurality of 3-D point locations within the spatial region from a plurality of images captured from mutually different angular perspectives.

According to a third aspect, there is provided a computer program including instructions which when executed by a computer cause the computer to perform the above method.

According to a third aspect, there is provided a non-transitory computer-readable medium containing computer-executable instruction. The computer-executable instructions cause a computer to execute the above method when executed by the computer.

A technical problem in the prior art is resolved, where the technical problem is how to accurately determine inliers to perform pose estimation in different regions of an image.

Therefore, in contradistinction to the prior arts, according to the method for estimating a likely pose of an image processing arrangement in respect of a spatial region and an image processing arrangement as provided in the disclosure, leverage multi-matching of feature points corresponding to a reference image and a target image is used to identify the best feature match from a plurality of plausible matches. The multi-match function simultaneously finds for each 3D feature point, the closest 2D feature point among the k-possible 2D feature points and computes the likelihood for the overall pose. This multi-match likelihood function is typically used in a sampling-based framework to search for the optimal pose by maximizing the likelihood.

These and other aspects of the disclosure will be apparent from and the implementation (s) described below.

BRIEF DESCRIPTION OF DRAWINGS

Implementations of the disclosure will now be described, by way of example only, with reference to the following diagrams in which:

FIG. 4 is a flow diagram illustrating a method for estimating a likely pose of an image processing arrangement in respect of a spatial region in accordance with an implementation of the disclosure.

DETAILED DESCRIPTION OF THE DRAWINGS

Implementations of the disclosure provide a method for estimating a likely pose of an image processing arrangement in respect of a spatial region; moreover, implementations of the disclosure provide an image processing arrangement for estimating the pose of a camera by identifying appropriate correspondences in different regions of an image, with an increased accuracy.

To make the solutions of the disclosure more comprehensible for a person skilled in the art, the following Implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the Implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units, but may include other steps or units that are not expressly listed or that are inherent to such process, method, product, or device."

Definitions

Image: An image is defined as a normal 2-dimensional picture (RGB or chrominance-luminance) acquired with a single camera.

Scene: A scene is a certain region of interest of the real world, seen or captured by a camera.

2D-feature point: 2D-feature point refers to a point in the image having (x,y) coordinates.

3D—Feature point: 3D—Feature point is a point in a 3D scene having (X,Y,Z) coordinates.

Correspondence: Correspondence refers to a pair of feature points. In this case, its a pair consisting of a 3D-feature point and the related 2D feature point.

Inlier correspondence or simply inlier: Inlier correspondence or simply inlier refers to a correctly determined correspondence, the 2D feature point is the projection of the corresponding 3D feature point to the image.

Pose: Pose refers to a 6D vector consisting of 3D location coordinates (x, y, z) and 3 angles for the orientation of an image capturing device.

Relative Pose: Euclidian Transform from one coordinate system/pose to another coordinate system/pose.

Likelihood Function: A function that evaluates how well the model estimation fits observations.

Loss: A scalar depicting the results of a negative Likelihood Function.

Figure 1:
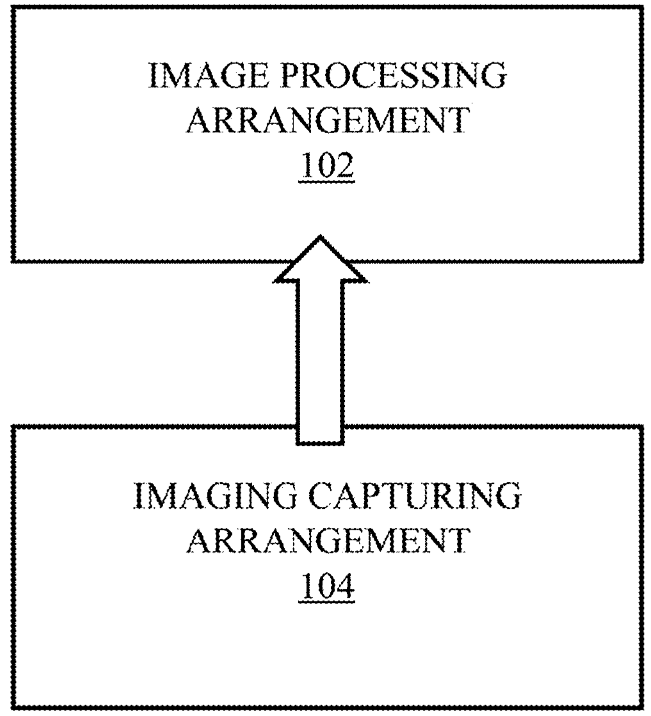
FIG. 1 is a block diagram of an image processing arrangement for estimating a likely pose in respect of a spatial region in accordance with an implementation of the disclosure.

FIG. 1 is a block diagram of an image processing arrangement 102 for estimating a likely pose in respect of a spatial region in accordance with an implementation of the disclosure. The image processing arrangement 102 is coupled to an imaging capturing arrangement 104 that is configured to capture one or more 2-D images of a scene within the spatial region. The image processing arrangement 102 is provided with spatial coordinates of one or more 3-D point locations within the spatial region. The image processing arrangement 102 is configured to identify key features present in the one or more 2-D images. The image processing arrangement 102 is further configured to identify a correspondence of one or more clusters of the one or more 3-D point locations to key feature points present in the one or more 2-D images. The image processing arrangement 102 is configured to estimate, from the identified correspondence, the likely pose of the image processing arrangement 102 relative to the spatial region by using a multi-match likelihood function that finds for each 3-D point location a closest 2-D feature point among k possible 2-D key feature points, where k is an integer greater than one. Here, k is a smaller integer having a value in a range of 0 or 10.

The image processing arrangement 102 is configured to simultaneously determine multiple matches of features of 3D feature points to 2D feature points in images and identify for each 3D feature point. This approach does not necessitate deciding on a fixed set of correspondences before conducting any optimization process. Furthermore, the closest 2D feature point can be adaptively selected among the one or more best matches during the optimization process. Due to the use of the one or more matches of the feature points, a much larger set of correspondences may be compared to traditional approaches efficiently.

Optionally, the image processing arrangement 102 to configured to determine the spatial coordinates of one or more 3-D point locations within the spatial region from one or more images captured from mutually different angular perspectives.

Figure 2:
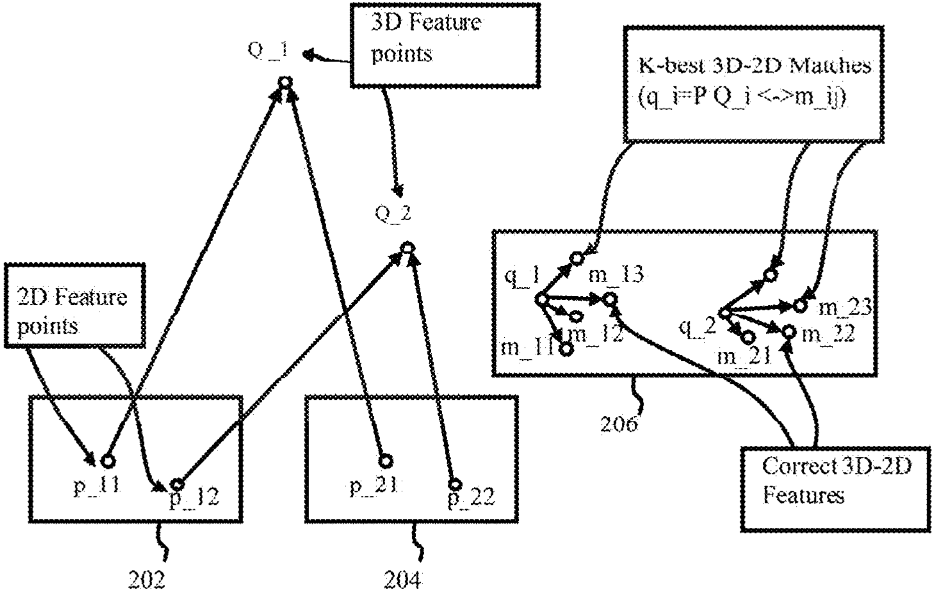
FIG. 2 is an illustration an example of feature point mapping in accordance with an implementation of the disclosure.

FIG. 2 is an illustration of an example of feature point mapping in accordance with an implementation of the disclosure. According to FIG. 2, an image processing arrangement identifies one or more 2D feature points p_11, p_12 in a first image 202 received from a first camera and one or more 2D features p_21, p_22 in a second image 204 received from a second camera. The image processing arrangement matches a 2D feature point p_11 of the first image 202 with a 2D feature point p_21 of the second image 204. The image processing arrangement matches the 2D feature point p_11 of the first image 202 with the 2D feature point p_21 of the second image 204 and extracts corresponding 3D feature points Q_1 and Q_2. Furthermore, the image processing arrangement extracts 2D feature points q_1 and q_2 from a target image 206. Here, q_1=PQ_1 and q_2=PQ_2. The image processing arrangement then matches 3D feature points Q_1 and Q_2 with the 2D feature points q_1 and q_2 in the target image 206, to determine feature correspondence or simply correspondences between feature points in the images 202, 204, and 206. The feature matching is typically done based on some feature descriptor similarity. Based on the feature matching, the pose of the first camera and the second camera can be estimated, for instance, a Perspective-n-Point (PnP) method.

Optionally, a multi-match likelihood function is implemented as a sampling-based framework to search for a best pose for the likely pose by computing a maximum value for the multi-match likelihood function. For each given pose parameters P(Φ), first the spatially closest point $m_{ij}$ among k $m_{ij}$, j=1 . . . ,k, is identified and then compute the Likelihood based on the closest point $m_{ij}$.

The image processing arrangement is configured for implementing the multi-match likelihood function as follows:

$$L(\Theta)=\sum_{i}^{N}\log\left(\exp\left(\frac{|P(\Theta)Q_i-m_i|^2}{2\sigma^2}\right)+\varepsilon\right)$$

Here, $Q_i$: i-th 3D Feature point, P(Φ): (inverse) Camera Pose parameterized by P(Φ) $Q_i$: point coordinates of the 3D feature point projected $Q_i$ into target image $m_i$: i-th 2D feature point in target image potentially corresponding to 3D feature point $Q_i$, ε: constant of uniform outlier distance distribution, where $Q_i$ is an i-th 3D feature point; P(Φ) refers to n inverse camera pose parameterized by Φ; P(Φ) $Q_i$: is point coordinates of the 3-D feature point projected $Q_i$ into a target image; $m_i$ refers an i-th 2-D feature point in the target image potentially corresponding to the 3-D feature point $Q_i$; and ε is a constant of uniform outlier distance distribution. The pose parameters Φ are chosen such that a multi-match likelihood L(Φ) is maximized to determine the likely pose. The image processing arrangement determines 3D points by detecting and matching feature points (p_11, p_12, p_21, p_22) captured by a stereo camera or captured from cameras with known pose between each other. Matching 3D feature points to 2D feature points in images creates the feature correspondences or simply correspondences.

For each given pose parameter P(Φ), the image processing arrangement firstly finds a spatially closest point $m_{ij}$ among k $m_{ij}$, j=1, . . . , k, and then computes a multi-match likelihood L(Φ) based on the closest point $m_{ij}$.

The multi-match likelihood function may be implemented as a single-match robust likelihood function as follows:

$$L(\Theta)=\sum_{i}^{N}\log\left(\exp\left(\min_{j=1}^{k}\frac{|P(\Theta)Q_i-m_{ij}|^2}{2\sigma^2}\right)+\varepsilon\right)$$

The index k is typically a small number, optionally in a range of 0 to 10; $Q_i$ is an i-th 3D feature point; P(Φ) is an inverse camera pose parameterized by Φ; P(Φ) $Q_i$ is point coordinates of the 3D feature point $Q_i$ projected into a target image; $m_{ij}$ is the ij-th 2D feature points in the target image potentially corresponding to 3D feature point $Q_i$; and ε is a constant of uniform outlier distance distribution.

Optionally, for each given pose parameters P(Φ), the closest point $m_{ij}$ among k $m_{ij}$, j=1, . . . ,k, w.r.t. f ( ) is determined first, then computes the multi-match likelihood function based on the closest point $m_{ij}$. The multi-match robust likelihood function, for all $$i\colon m_i=\min_{j=1}^{k}f(\Theta,Q_i,m_{ij},D_q,D_{m_{ij}})$$

is given by:

$$L(\Theta)=\sum_{i}^{N}\log\left(\exp\left(\frac{|P(\Theta)Q_i-m_i|^2}{2\sigma^2}\right)+\varepsilon\right)$$

Here $Q_i$ is an i-th 3D feature point; P(Φ) is an inverse camera pose parameterized by Φ; $q_i$=P(Φ) $Q_i$: point coordinates of the 3D feature point $Q_i$ projected into target image to obtain $q_i$; $m_{ij}$ is the ij-th 2D feature points in a target image potentially corresponding to a 3D feature point $Q_i$; ε is a constant of uniform outlier distance distribution; $D_q$, $D_m$ is the descriptor vectors of q and m, respectively and $f(\Theta, Q_i, m_{ij}, D_q, D_{m_{ij}})$ is a function to determine a distance depending on both the descriptor similarity as well as spatial distance between the projection q of the 3D point $Q$ into the image and its potential correspondence m.

The multi-match likelihood function may be implemented as a multi-match robust likelihood function as, for all $$i\colon m_i=\min_{j=1}^{k}f(\Theta,Q_i,m_{ij},D_q,D_{m_{ij}})$$

$$L(\Theta)=\sum_{i}^{N}\log\left(\exp\left(\frac{|P(\Theta)Q_i-m_i|^2}{2\sigma^2}\right)+\varepsilon\right)$$

wherein a function f ( ) is defined by $$f(\Theta, Q_i, m_{ij}, D_q, D_{m_{ij}}) = |P(\Theta)Q_i - m_{ij}|^2 + \lambda * |D_q - D_{m_{ij}}|^2$$

or $$f(\Theta, Q_i, m_{ij}, D_q, D_{m_{ij}}) = |P(\Theta)Q_i - m_{ij}|^2 + \lambda * \left(1 - \frac{D_q D_{m_{ij}}}{|D_q||D_{m_{ij}}|}\right)$$

where a position of q in a given image depends both on camera pose parameters Φ and their 3D position $Q$:

$$q_i = P(\Theta)Q_i$$

For a given feature point q, there are k potential correspondences, and $m_{ij}$ is the i, j-the 2D feature points in a target image potentially corresponding to a 3D feature point $Q_i$; ε is a constant of uniform outlier distance distribution and $D_q$, $D_m$ is the descriptor vectors of q and m, respectively.

Figure 3:
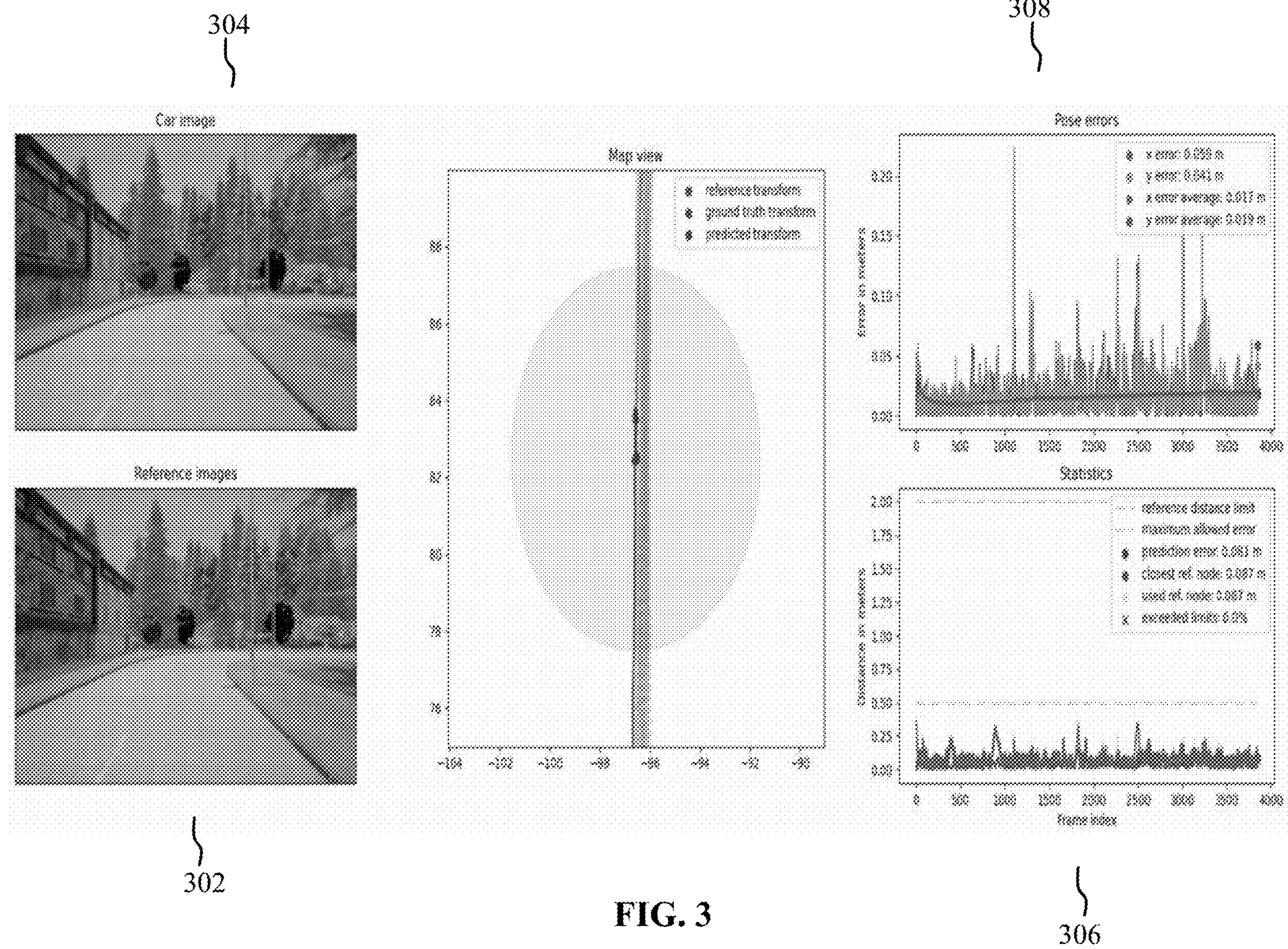
FIG. 3 is an example illustration of multi-match feature points of a location in accordance with an implementation of the disclosure.

FIG. 3 is an example illustration of multi-match feature points of a location in accordance with an implementation of the disclosure. FIG. 3 includes a first image 302 and a second image 304. The first image 302 may be a reference image and the second image 304 may be a target image. An image processing arrangement detects the 3D feature points and 2D feature points in the first image 302 and the second image 304 and matches the detected 3D feature points and 2D feature points to find enough correct correspondences (called inliers) in different regions of the image to be able to accurately estimate pose.

According to FIG. 3, instead of determining one single match for a reference 3D feature point, between the first image 302 and the second image 304, one or more k-best 2D feature point matches are detected, thereby creating a collection of multi-matches. The multi-match likelihood function simultaneously finds for each 3D feature point the closest 2D feature point among the k possible 2D feature points and computes the likelihood function for the overall pose. This multi-match likelihood function is typically used in a sampling-based framework to search for the best pose by maximizing the likelihood function. Due to the usage of multiple potential matches/correspondences in FIG. 3, Perspective-n-Point (PnP) method is allowed to have a higher inlier rate. This enables better accuracies and better robustness of the final results. Error statistics 306 after running through a sequence of images indicates that the multi-match PnP results in a smaller pose error 308 which is a smaller maximum error as well as a smaller average error.

The approach according to FIG. 3, does not have to determine for a fixed set of correspondences before conducting any optimization process, as the closest 2D feature point can be adaptively selected among the k best matches during the optimization process. This way, in an efficient way, a much larger set of inliers can be captured compared to traditional approaches.

FIG. 4 is a flow diagram illustrating a method for estimating a likely pose of an image processing arrangement in respect of a spatial region in accordance with an implementation of the disclosure. The image processing arrangement is coupled to the image capturing arrangement that is configured to capture one or more 2-D images of a scene within the special region. The image processing arrangement is provided with spatial coordinates of one or more 3-D point locations within the spatial region. At a step 402, key features present in the one or more 2-D images are identified. At a step 404, a correspondence of one or more clusters of one or more 3-d point locations to key feature points present in the one or more 2D images is identified. At a step 406, the likely pose of the image processing arrangement relative to the spatial region is estimated from the correspondence by using a multi-match likelihood function that finds for each 3-D point location a closest 2-D feature point among k possible 2-D key feature points, where k is an integer greater than one.

Optionally, the method includes determining the spatial coordinates of one or more 3-D point locations within the spatial region from one or more images captured from mutually different angular perspectives. Optionally, the method includes implementing the multi-match likelihood function as a sampling-based framework to search for a best pose for the likely pose by computing a maximum value for the multi-match likelihood function. The sampling-based framework approach avoids finding local minima for a cost function and finds a best overall minimum for the cost function. The multi-match likelihood function evaluates how well the model estimation fits to the observations.

Optionally, the method includes using an optimization process that is used to adaptively select a closest 2-D key feature point among k best matches and to capture an increased number of inliers within the 2-D image.

Optionally, the method includes implementing the multi-match likelihood function using the expression:

$$L(\Theta) = \sum_i^N \log\left(\exp\left(\frac{|P(\Theta)Q_i - m_i|^2}{2\sigma^2}\right) + \varepsilon\right)$$

where $Q_i$=an i-th 3D feature point;

P(Φ): =an inverse camera pose parameterized by Φ;

P(Φ) $Q_i$:=point coordinates of the 3-D feature point projected $Q_i$ into a target image;

$m_i$:=an i-th 2-D feature point in the target image potentially corresponding to the 3-D feature point $Q_i$; and ε: =a constant of uniform outlier distance distribution, where pose parameters Φ are chosen such that a multi-match likelihood L(Φ) is maximized to determine the likely pose.

Optionally, the multi-match likelihood function is implemented as a single-match robust likelihood function as follows:

$$L(\Theta) = \sum_i^N \log\left(\exp\left(\min_{j=1}^{k} \frac{|P(\Theta) - Q_i - m_{ij}|^2}{2\sigma^2}\right) + \varepsilon\right)$$

where an index k is typically a small number, optionally in a range of 0 to 10;

$Q_i$ is an i-th 3D feature point; P(Φ) is an inverse camera pose parameterized by Φ;

P(Φ) $Q_i$: =point coordinates of the 3D feature point $Q_i$ projected into a target image;

$m_{ij}$: =ij-th 2D feature points in the target image potentially corresponding to 3D feature point $Q_i$; and ε: =a constant of uniform outlier distance distribution. For each given pose parameter P(Φ), the method includes firstly finding a spatially closest point $m_{ij}$ among k $m_{ij}$, j=1, . . . ,k, and then computing a multi-match likelihood L(Φ) based on the closest point $m_{ij}$.

Optionally, the multi-match likelihood function is implemented as a multi-match robust likelihood function as follows:

$$\text{For all } i\text{: } m_i = \min_{j=1}^{k} f(\Theta, Q_i, m_{ij}, D_q, D_{m_{ij}})$$

$$L(\Theta) = \sum_i^N \log\left(\exp\left(\frac{|P(\Theta)Q_i - m_i|^2}{2\sigma^2}\right) + \varepsilon\right)$$

where $Q_i$:=an i-th 3D feature point;

P(Φ): =an inverse camera pose parameterized by Φ

$q_i$=P(Φ) Q point coordinates of the 3D feature point $Q_i$ projected into target image to obtain $q_i$;

$m_{ij}$: =ij-th 2D feature points in a target image potentially corresponding to a 3D feature point $Q_i$;

ε: =a constant of uniform outlier distance distribution;

$D_q$, =descriptor vectors of q and m, respectively;

f(Θ, $Q_i$ $m_{ij}$, $D_q$, $D_{m_{ij}}$)=a function to determine a distance depending on both the descriptor similarity as well as spatial distance between the projection q of the 3D point Q into the image and its potential correspondence m.

For each given pose parameter P(Φ), the method includes firstly finding a closest point $m_{ij}$ among k $m_{ij}$, j=1, . . . ,k, w.r.t. f( ) and then computing a multi-match likelihood L(Φ) based on the closest point $m_{ij}$.

Optionally, the multi-match likelihood function is implemented as a multi-match robust likelihood function as follows:

$$\text{For all } i\text{: } m_i = \min_{j=1}^{k} \min_j f(\Theta, Q_i, m_{ij}, D_q, D_{m_{ij}})$$

$$L(\Theta) = \sum_i^N \log\left(\exp\left(\frac{|P(\Theta)Q_i - m_i|^2}{2\sigma^2}\right) + \varepsilon\right)$$

where a function f ( ) is defined by $$f(\Theta, Q_i, m_{ij}, D_q, D_{m_{ij}}) = |P(\Theta)Q_i - m_{ij}|^2 + \lambda * \left|D_q - D_{m_{ij}}\right|^2 \text{ or}$$

$$f(\Theta, Q_i, m_{ij}, D_q, D_{m_{ij}}) = |P(\Theta)Q_i - m_{ij}|^2 + \lambda * \left(1 - \frac{D_q D_{m_{ij}}}{|D_q|\left|D_{m_{ij}}\right|}\right).$$

where a position of q in a given image depends both on camera pose parameters Φ and their 3D position $Q$:

$$q_i = P(\Theta)Q_i$$

For a given feature point q, there are k potential correspondences, and $m_{ij}$: =i, j-th 2D feature points in a target image potentially corresponding to a 3D feature point $Q_i$;

ε: =a constant of uniform outlier distance distribution;

$D_q$, $D_m$=descriptor vectors of q and m, respectively.

A computer program including instructions which when executed by a computer cause the computer to perform the above method.

A non-transitory computer-readable medium containing computer-executable instructions and the computer-executable instructions cause a computer to execute the above method when executed by the computer.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions and alterations can be made herein without departing from the spirit and scope of the invention as defined by the appended claims.

What is claimed is:

1. A method for estimating a likely pose of an image processing arrangement in respect of a spatial region, wherein the image processing arrangement is coupled to an imaging capturing arrangement that is configured to capture one or more 2-D images of a scene within the spatial region, wherein the image processing arrangement is provided with spatial coordinates of a plurality of 3-D point locations within the spatial region, wherein the method comprises:

(i) identifying key feature points present in the one or more 2-D images;

(ii) identifying a correspondence of one or more clusters of the plurality of 3-D point locations to key feature points present in the one or more 2-D images, wherein the one or more clusters are a variable size set of correspondences between the plurality of 3-D point locations and key feature points present in the one or more 2-D images; and (iii) from the correspondence, estimating the likely pose of the image processing arrangement relative to the spatial region by using a multi-match likelihood function that finds for each 3-D point location a closest 2-D feature point among k possible 2-D key feature points, wherein k is an integer greater than one, and wherein the method further comprises implementing the multi-match likelihood function as follows:

$$L(\Theta) = \Sigma_i^N \log\left(\exp\left(\frac{|P(\Theta)Q_i - m_i|^2}{2\sigma^2}\right) + \varepsilon\right)$$

wherein $Q_i$=an i-th 3D feature point;

P(Φ): =an inverse camera pose parameterized by Φ;

P(Φ) $Q_i$: =point coordinates of the 3-D feature point projected $Q_i$ into a target image;

$m_i$:=an i-th 2-D feature point in the target image potentially corresponding to the 3-D feature point $Q_i$; and ε:=a constant of uniform outlier distance distribution, and wherein pose parameters Φ are chosen such that a multi-match likelihood L(Φ) is maximized to determine the likely pose.

2. The method of claim 1, further comprising determining the spatial coordinates of the plurality of 3-D point locations within the spatial region from a plurality of images captured from mutually different angular perspectives.

3. The method of claim 1, further comprising implementing the multi-match likelihood function as a sampling-based framework to search for a best pose for the likely pose by computing a maximum value for the multi-match likelihood function.

4. The method of claim 1, further comprising using an optimization process to adaptively select a closest 2-D key feature point among k best matches, to capture inliers within the 2-D image.

5. The method of claim 1, wherein the multi-match likelihood function is implemented as a single-match robust likelihood function as follows:

$$L(\Theta) = \sum_{i}^{N} \log\left(\exp\left(\min_{j=1}^{k} \frac{|P(\Theta) - Q_i - m_{ij}|^2}{2\sigma^2}\right) + \varepsilon\right)$$

wherein an index k is typically a small number, optionally in a range of 0 to 10;

$Q_i$=an i-th 3D feature point;

P(Φ): =an inverse camera pose parameterized by Φ;

P(Φ) $Q_i$: =point coordinates of the 3-D feature point projected $Q_i$ into a target image;

$m_{ij}$:=an ij-th 2-D feature point in the target image potentially corresponding to the 3-D feature point $Q_i$; and ε:=a constant of uniform outlier distance distribution, wherein, for each given pose parameters P (Φ), the method includes firstly finding a spatially closest point $m_{ij}$, j=l, . . . ,k, and then computing a multi-match likelihood L(Φ) based on the closest point $m_{ij}$.

6. The method of claim 1, wherein the multi-match likelihood function is implemented as a multi-match robust likelihood function as follows:

$$\text{For all } i\text{: } m_i = \min_{j=1}^{k} f(\Theta, Q_i, m_{ij}, D_q, D_{m_{ij}})$$

$$L(\Theta) = \Sigma_i^N \log\left(\exp\left(\frac{|P(\Theta)Q_i - m_i|^2}{2\sigma^2}\right) + \varepsilon\right)$$

wherein $Q_i$: =an i-th 3D feature point;

P(Φ): =an inverse camera pose parameterized by Φ;

P(Φ) Q=point coordinates of the 3D feature point $Q_i$ projected into a target image to obtain $q_i$;

$m_{ij}$: =ij-th 2D feature points in the target image potentially corresponding to 3D feature point $Q_i$;

ε: =a constant of uniform outlier distance distribution, $D_p$, $D_m$: =descriptor vectors of q and m, respectively; and $f(\Phi, Q_i, M_{ij}, D_q, D_{m_{ij}})$=a function to determine a distance depending on both the descriptor similarity as well as spatial distance between the projection q of the 3D point Q into the image and its potential correspondence m, wherein, for each given pose parameter P(Φ), the method includes firstly finding a closest point $m_{ij}$ among k $m_{ij}$,j=1, . . . ,k, w.r.t. f(), and then computing a multi-match likelihood L(Φ) based on the closest point $m_{ij}$.

7. The method of claim 1, wherein the multi-match likelihood function is implemented as a multi-match robust likelihood function as follows:

$$\text{For all } i\text{: } m_i = \min_{j=1}^{k} f(\Theta, Q_i, m_{ij}, D_q, D_{m_{ij}})$$

$$L(\Theta) = \Sigma_i^N \log\left(\exp\left(\frac{|P(\Theta)Q_i - m_i|^2}{2\sigma^2}\right) + \varepsilon\right)$$

wherein a function f() is defined by $$f(\Theta, Q_i, m_{ij}, D_q, D_{m_{ij}}) = |P(\Theta)Q_i - m_{ij}|^2 + \lambda * |D_q - D_{m_{ij}}|^2 \text{ or}$$

$$f(\Theta, Q_i, m_j, D_q, D_{m_{ij}}) = |P(\Theta)Q_i - m_{ij}|^2 + \lambda * \left(1 - \frac{D_q D_{m_{ij}}}{|D_q||D_{m_{ij}}|}\right)$$

wherein a position of q in a given image depends both on camera pose parameters Φ and their 3D position Q;

$$q_i = P(\Theta)Q_i$$

wherein, for a given feature point q, there are k potential correspondences, and $m_{ij}$: =i, j-th 2D feature points in a target image potentially corresponding to a 3D feature point $Q_i$;

ε: =a constant of uniform outlier distance distribution; and $D_q$, $D_m$: =descriptor vectors of q and m, respectively.

8. An image processing arrangement for estimating a likely pose in respect of a spatial region, wherein the image processing arrangement is coupled to an imaging capturing arrangement that is configured to capture one or more 2-D images of a scene within the spatial region, wherein the image processing arrangement is provided with spatial coordinates of a plurality of 3-D point locations within the spatial region, wherein the image processing arrangement is configured to:

(i) identify key feature points present in the one or more 2-D images;

(ii) identify a correspondence of one or more clusters of the plurality of 3-D point locations to key feature points present in the one or more 2-D images, wherein the one or more clusters are a variable size set of correspondences between the plurality of 3D point locations and key features points present in the one or more 2D images; and (iii) based on the correspondence, estimate the likely pose of the image processing arrangement relative to the spatial region by using a multi-match likelihood function that finds for each 3-D point location a closest 2-D feature point among k possible 2-D key feature points, wherein k is an integer greater than one, wherein the image processing arrangement is further configured to implement the multi-match likelihood function as follows:

$$L(\Theta) = \sum_{i}^{N} \log\left(\exp\left(\frac{|P(\Theta)Q_i - m_i|^2}{2\sigma^2}\right) + \varepsilon\right)$$

wherein $Q_i$=an i-th 3D feature point;

P(Φ): =an inverse camera pose parameterized by Φ;

P(Φ) $Q_i$: =point coordinates of the 3-D feature point projected $Q_i$ into a target image;

$m_{ij}$: an i-th 2-D feature point in a target image potentially corresponding to a 3D feature point $Q_i$;

ε: =a constant of uniform outlier distance distribution, and wherein pose parameters Φ are chosen such that a multi-match likelihood L(Φ) is maximized to determine the likely pose.

9. The image processing arrangement of claim 8, wherein the image processing arrangement is further configured to determine the spatial coordinates of the plurality of 3-D point locations within the spatial region from a plurality of images captured from mutually different angular perspectives.

10. A non-transitory computer-readable medium containing computer-executable instructions, wherein the computer-executable instructions cause a computer to execute a method for estimating a likely pose of an image processing arrangement in respect of a spatial region, wherein the image processing arrangement is coupled to an imaging capturing arrangement that is configured to capture one or more 2-D images of a scene within the spatial region, wherein the image processing arrangement is provided with spatial coordinates of a plurality of 3-D point locations within the spatial region, wherein the method comprises:

(i) identifying key feature points present in the one or more 2-D images;

(ii) identifying a correspondence of one or more clusters of the plurality of 3-D point locations to key feature points present in the one or more 2-D images, wherein the one or more clusters are a variable size set of correspondences between the plurality of 3-D point locations and key feature points in the one or more 2-D images; and (iii) from the correspondence, estimating the likely pose of the image processing arrangement relative to the spatial region by using a multi-match likelihood function that finds for each 3-D point location a closest 2-D feature point among k possible 2-D key feature points, wherein k is an integer greater than one, and ps wherein the method further comprises implementing the multi-match likelihood function as follows:

$$L(\Theta)=\Sigma_i^N \log\left(\exp\left(\frac{|P(\Theta)Q_i-m_i|^2}{2\sigma^2}\right)+\varepsilon\right)$$

wherein $Q_i$=an i-th 3D feature point;

P(Φ): =an inverse camera pose parameterized by Φ;

P(Φ) $Q_i$: =point coordinates of the 3-D feature point projected $Q_i$ into a target image;

$m_i$: =an i-th 2-D feature point in the target image potentially corresponding to the 3-D feature point $Q_i$; and ε: =a constant of uniform outlier distance distribution, and wherein pose parameters Φ are chosen such that a multi-match likelihood L(Φ) is maximized to determine the likely pose.

11. The non-transitory computer-readable medium of claim 10, further comprising determining the spatial coordinates of the plurality of 3-D point locations within the spatial region from a plurality of images captured from mutually different angular perspectives.

12. The non-transitory computer-readable medium of claim 10, further comprising implementing the multi-match likelihood function as a sampling-based framework to search for a best pose for the likely pose by computing a maximum value for the multi-match likelihood function.

13. The non-transitory computer-readable medium of claim 10, further comprising using an optimization process to adaptively select a closest 2-D key feature point among k best matches, to capture inliers within the 2-D image.

14. The non-transitory computer-readable medium of claim 10, wherein the multi-match likelihood function is implemented as a single-match robust likelihood function as follows:

$$L(\Theta)=\sum_i^N \log\left(\exp\left(\min_{j=1}^k \frac{|P(\Theta)-Q_i-m_{ij}|^2}{2\sigma^2}\right)+\varepsilon\right)$$

wherein an index k is typically a small number, optionally in a range of 0 to 10;

$Q_i$: =an i-th 3D feature point;

P(Φ): =an inverse camera pose parameterized by Φ;

P(Φ) $Q_i$: =point coordinates of the 3D feature point $Q_i$ projected into a target image;

$m_{ij}$: =ij-th 2D feature points in the target image potentially corresponding to 3D feature point $Q_i$; and ε: =a constant of uniform outlier distance distribution, wherein, for each given pose parameter P(Φ), the method includes firstly finding a spatially closest point $m_{ij}$ among k $m_{ij}$, j=1, . . . ,k, and then computing a multi-match likelihood L(Φ) based on the closest point $m_{ij}$.

15. The non-transitory computer-readable medium of claim 10, wherein the multi-match likelihood function is implemented as a multi-match robust likelihood function as follows:

$$\text{For all } i\text{: } m_i=\min_{j=1}^k f(\Theta, Q_i, m_{ij}, D_q, D_{m_{ij}})$$

$$L(\Theta)=\sum_i^N \log\left(\exp\left(\frac{|P(\Theta)Q_i-m_i|^2}{2\sigma^2}\right)+\varepsilon\right)$$

wherein $Q_i$: =an i-th 3D feature point;

P(Φ): =an inverse camera pose parameterized by Φ:

$q_i$=P(Φ) $Q_i$: point coordinates of the 3D feature point projected $Q_i$ into a target image;

$m_{ij}$: ij-th 2-D feature point in a target image potentially corresponding to a 3D feature point $Q_i$;

ε: =a constant of uniform outlier distance distribution;

$D_q$, $D_m$: =descriptor vectors of q and m, respectively; and $f(\Theta, Q_i, m_{ij}, D_q, D_{m_{ij}})$=a function to determine a distance depending on both the descriptor similarity as well as spatial distance between the projection q of the 3D point Q into the image and its potential correspondence m, wherein for each given pose parameter P(Φ), the method includes firstly finding a closest point $m_{ij}$ among k $m_{ij}$, j=1, . . . ,k, w.r.t. f( ) and then computing a multi-match likelihood L(Φ) based on the closest point $m_{ij}$.

16. The non-transitory computer-readable medium of claim 10, wherein the multi-match likelihood function is implemented as a multi-match robust likelihood function as follows:

$$\text{For all } i\text{: } m_i = \min_{j=1}^{k} f\left(\Theta, Q_i, m_{ij}, D_q, D_{m_{ij}}\right)$$

$$L(\Theta) = \sum_i^N \log\left(\exp\left(\frac{|P(\Theta)Q_i - m_i|^2}{2\sigma^2}\right) + \varepsilon\right)$$

wherein a function f( ) is defined by $$f\left(\Theta, Q_i, m_{ij}, D_q, D_{m_{ij}}\right) = |P(\Theta)Q_i - m_{ij}|^2 + \lambda * \left|D_q - D_{m_{ij}}\right|^2$$

or $$f\left(\Theta, Q_i, m_{ij}, D_q, D_{m_{ij}}\right) = |P(\Theta)Q_i - m_{ij}|^2 + \lambda * \left(1 - \frac{D_q D_{m_{ij}}}{|D_q|\left|D_{m_{ij}}\right|}\right)$$

wherein a position of q in a given image depends both on camera pose parameters Φ and their 3D position Q:

$$q_t = P(\Theta)Q_t$$

wherein, for a given feature point q, there are k potential correspondences, and $m_{ij}$: =i, j-th 2D feature points in a target image potentially corresponding to a 3D feature point $Q_i$;

ε: =a constant of uniform outlier distance distribution; and $D_q$, $D_m$:=descriptor vectors of q and m, respectively.

* * * * *